United States Patent
Aussant et al.

(10) Patent No.: US 9,196,974 B2
(45) Date of Patent: Nov. 24, 2015

(54) UNDERWATER CONNECTION ASSEMBLY FOR USE IN UNDERWATER COMMUNICATION SYSTEMS

(71) Applicant: Alcatel Lucent, Paris (FR)

(72) Inventors: Pierre Aussant, Nozay (FR); Jose Chesnoy, Nozay (FR); Jean-Francois Marcerou, Nozay (FR); Alain Cordier, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/347,681

(22) PCT Filed: Sep. 19, 2012

(86) PCT No.: PCT/EP2012/068389
§ 371 (c)(1),
(2) Date: Mar. 27, 2014

(87) PCT Pub. No.: WO2013/045320
PCT Pub. Date: Apr. 4, 2013

(65) Prior Publication Data
US 2014/0238716 A1    Aug. 28, 2014

(30) Foreign Application Priority Data
Sep. 29, 2011   (EP) .................................. 11306246

(51) Int. Cl.
*G02B 6/44* (2006.01)
*H01R 4/66* (2006.01)

(52) U.S. Cl.
CPC ................ *H01R 4/66* (2013.01); *G02B 6/4428* (2013.01)

(58) Field of Classification Search
CPC ...... H01R 4/66; G02B 6/4428; G02B 6/4448; H01S 3/0674; H04B 10/291; H04B 10/2912; H04B 10/2939
See application file for complete search history.

(56) References Cited

U.S. PATENT DOCUMENTS

| | | | | |
|---|---|---|---|---|
| 2,440,963 | A | * | 5/1948 | Luce ................................ 72/376 |
| 4,708,427 | A | * | 11/1987 | Ejiri et al. ........................ 385/87 |
| 4,799,825 | A | * | 1/1989 | Meyerhoff et al. ........... 405/188 |
| 5,790,358 | A | * | 8/1998 | Kojima et al. .................. 361/63 |
| 2003/0102212 | A1 | * | 6/2003 | Watson et al. ........... 204/297.01 |
| 2012/0027522 | A1 | * | 2/2012 | Ives et al. ................... 405/184.4 |

FOREIGN PATENT DOCUMENTS

| | | |
|---|---|---|
| EP | 1312962 | 5/2003 |
| EP | 2209175 | 7/2010 |
| GB | 2463487 | 3/2010 |
| JP | 61058419 | 3/1986 |
| JP | 1201610 | 8/1989 |

(Continued)

*Primary Examiner* — Akm Enayet Ullah
(74) *Attorney, Agent, or Firm* — Patti & Malvone Law Group, LLC

(57) ABSTRACT

An underwater connection assembly comprises an underwater device and an optical cable segment. The optical cable segment is configured to be coupled to a first sea earth by means of a first sea earthing electrode and the underwater device is configured to be coupled to a second sea earth by means of a second sea earthing electrode. In use, the first sea earthing electrode and the second sea earthing electrode are disposed at separated locations from each other.

6 Claims, 2 Drawing Sheets

(56) References Cited

FOREIGN PATENT DOCUMENTS

| | | | |
|---|---|---|---|
| JP | 1201610 A | * | 8/1989 |
| JP | H01236522 | | 9/1989 |
| JP | H0224909 | | 1/1990 |
| JP | H07264105 | | 10/1995 |
| JP | 2624499 | | 6/1997 |
| WO | 94/18732 | | 8/1994 |
| WO | 00/38291 | | 6/2000 |

* cited by examiner

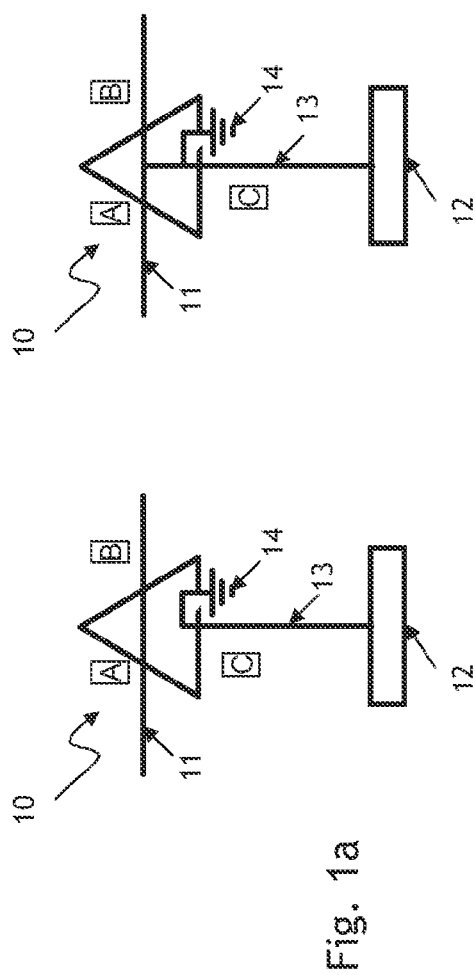
Fig. 1a
Fig. 1b
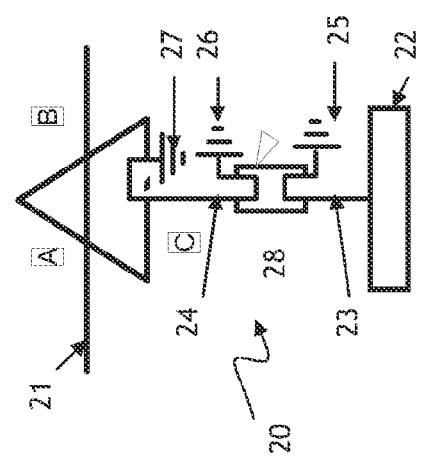
Fig. 2

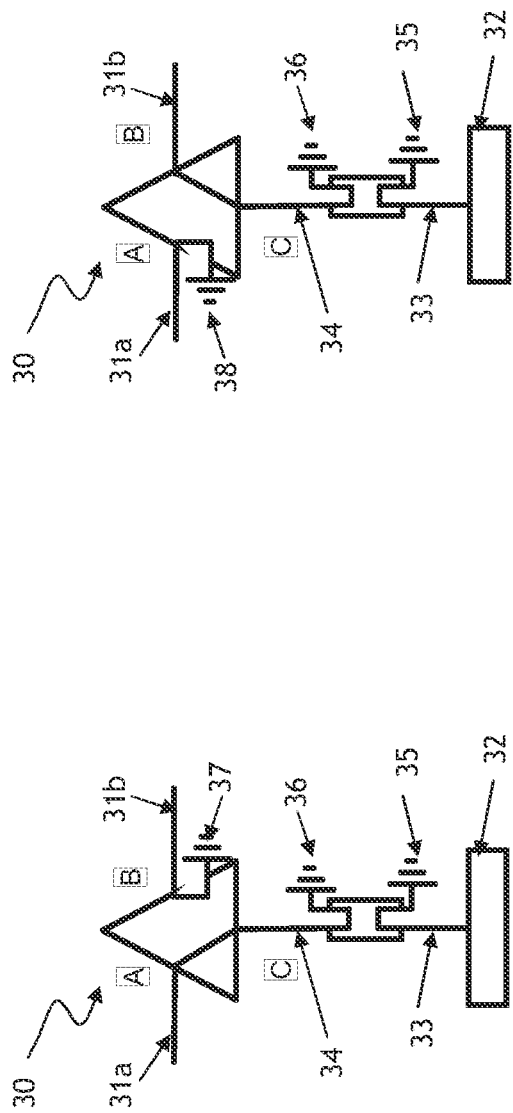
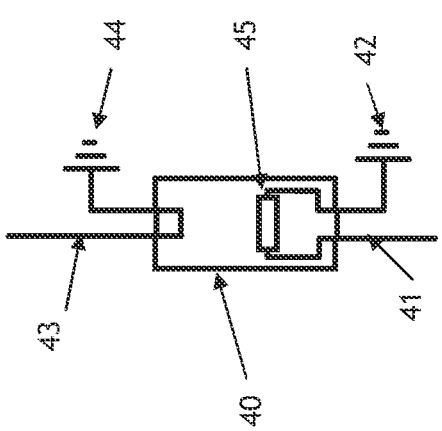
Fig. 3a
Fig. 3b
Fig. 4

UNDERWATER CONNECTION ASSEMBLY FOR USE IN UNDERWATER COMMUNICATION SYSTEMS

CROSS REFERENCE

This application claims the benefit of European patent application No. 11306246.7, filed 29 Sep. 2011 and claims the benefit of PCT application No. PCT/EP2012/068389, filed 19 Sep. 2012, the respective contents of which are hereby incorporated by reference in their entirety.

The present invention relates to an underwater connection assembly for use in underwater communication systems such as submarine optical telecommunication systems.

BACKGROUND ART

In underwater communication systems, cables are typically laid in water in order to connect a first terminal station to a second terminal station. In such systems a cable may be used for conveying significant amount of data between the two terminal stations while delivering power to the submerged amplifiers from the terminal stations. Such cables are typically referred to as trunk cables or simply trunk.

In submarine optical telecommunication systems there are circumstances where it may be needed to connect several land stations or offshore platforms to the trunk. Typically, this is done by using additional segments of cable in order to connect a land station to the trunk. The cable segment is typically connected to the trunk by means of a branching unit.

SUMMARY

In many occasions the cable segment is a repeatered segment which typically allows for the reconfiguration of the powering path. By a repeatered segment, it is typically meant to refer to a segment of underwater optical cable in which one or more repeaters are used along the length of the optical cable in order to amplify the optical signal which may have been attenuated as a result of travelling a certain distance in the segment.

The additional segments are then safely terminated in the land station typically via a cable termination cubicle of the power feed equipment.

On the other hand, in some circumstances where the length of the additional segment is not long enough to justify the use of amplifiers or, where the network is intended for interconnecting offshore platforms to the land stations without the need of amplification, un-repeatered segments may be used.

In the absence of repeaters on the segment, the power needed in order to operate on that segment is typically provided by the land station or the offshore station directly connected to the segment.

As the voltage present on the trunk cable is typically high (up to 12 to 15 KV), it is desirable to avoid circumstances in which the voltage present on the trunk may be applied to the termination of the segment, even when the branching units are reconfigured to switch off during cable maintenance operations.

In order to avoid a situation where the voltage on the trunk is applied to the terminal station through a branching unit and the segment connecting the branching unit to the terminal station, one known solution is to provide a permanent connection from a branch cable of the branching unit to which said segment is connected, to the sea earth. This is typically done at or close to the branching unit, typically by means of a sea electrode. This solution however presents a drawback because often a firm and long-lasting contact of the sea electrode to the sea bed may not be always ensured thus causing a failure in such sea earthing. One cause of such failure may be that the sea electrode is defective and/or it is isolated from the branching unit. In such case, the branching unit is disconnected from the sea earth and it may not be possible to guarantee the safety of the system. Typically when maintenance operation is performed at the terminal station (land station or offshore platform) the branching unit is configured such that no electrical connection exists between the trunk cable and the terminal station in order to avoid presence of unwanted high voltage at the terminal station.

However, if during such maintenance operations, a malfunctioning of the branching unit occurs, the voltage from the trunk may be applied to the terminal station through the segment. Therefore if the earth connection fails, the above-mentioned high voltages (10 KV or higher) from the trunk may appear at the terminal station. This may be dangerous because at such instances, operating personnel may be in contact with the terminal station for example performing maintenance operations (often referred to as electroding), which may result in personal injuries and/or significant damages to the land or offshore platforms (for example, if the accidental presence of high voltage generates sparks).

Some embodiments of the present disclosure feature an underwater connection assembly comprising an underwater device and an optical cable segment configured for conveying electrical and optical signals to and from a terminal station, wherein the optical cable segment is configured to be coupled to a first sea earth by means of a first sea earthing electrode and the underwater device is configured to be coupled to a second sea earth by means of a second sea earthing electrode and wherein, in use, the first sea earthing electrode and the second sea earthing electrode are disposed at separated locations from each other.

According to some specific embodiments, in use, the first sea earthing electrode and the second sea earthing electrode are separated from each other by mean of a sea earthing unit, wherein the sea earthing unit is configured to maintain the first sea earthing electrode and the second sea earthing electrode separated from each other.

Some embodiments of the present disclosure relate to a submarine optical telecommunication system comprising the underwater connection assembly as featured herein.

According to some specific embodiments, the submarine optical telecommunication system comprises an underwater oil and gas communication network.

These and further features and advantages of the present invention are described in more detail, for the purpose of illustration and not limitation, in the following description as well as in the claims with the aid of the accompanying drawings.

BRIEF DESCRIPTION OF THE DRAWINGS

FIGS. 1a and 1b are exemplary schematic representations of two connection configurations of a known underwater device.

FIG. 2 is an exemplary schematic representation of an underwater connection assembly according to some embodiments.

FIGS. 3a and 3b are exemplary schematic representations of various connection scenarios of the underwater connection assembly of FIG. 2.

FIG. 4 is an exemplary schematic representation in some detail of a sea earthing unit configured for use in the connection assembly of FIG. 2.

DETAILED DESCRIPTION

It is to be noted that, for the sake of simplicity, the drawings are intended to mainly show the connection elements that are relevant for understanding the present disclosure. Those skilled in the related art will realize that other connection elements, for example optical fibers used for transmitting optical signals and/or electric cables used for conveying electric power are not shown although these elements may be present and necessary for the operation of the devices recited herein.

In FIGS. 1a and 1b exemplary schematic representations of two configurations of a known underwater device are shown. Like elements in these figures have like reference numerals. The underwater device may be for example a submarine branching unit. In the following description, reference is made to a submarine branching unit by way of non-limiting example.

FIG. 1a shows an underwater branching unit 10 which is coupled to a trunk cable (or trunk) 11. A terminal station 12, for example a land station or an offshore platform, is coupled to the branching unit 10 by means of a branch cable (or cable segment) 13. The cable segment may be an optical cable, comprising (although not shown) optical fibers for carrying optical signals and electrical cables for conveying electric power. In the scenario of FIG. 1a, a first configuration of the branching unit 10 is shown in which the trunk 11 is coupled to port A and port B, and the branch cable 13 is connected to a sea earth by means of a sea earthing electrode 14. However, as mentioned above, situations may occur that the sea earth electrode 14 does not make a reliable contact to the sea earth. In such conditions, if by error or malfunction, the branching unit 10 switches the trunk voltage onto the branch cable 13, this voltage will become present at the terminal station 12 which would give rise to significant danger for the personnel operating at the terminal station, for example performing maintenance work, or would lead to significant damage to the equipment at the terminal station 12.

FIG. 1b shows a different scenario of configuration of the branching unit 10 in which the trunk 11, coupled to port A and port B, and the branch cable 13 are all connected to a sea earth by means of the sea earthing electrode 14.

Other configurations are also possible but not described herein as they are considered not relevant for the understanding of the present specification.

FIG. 2 shows an exemplary schematic representation of an underwater connection assembly according to some embodiments of the present disclosure. The connection assembly 2 comprises an underwater device, which by way of non-limiting example may be a branching unit 20 which is coupled to a trunk 21. A terminal station 22, for example a land station or an offshore platform, is coupled to the branching unit 20 by means of a set of branch cables (or cable segments) 23 and 24 as will be further described below. The cable segments may be optical cables, comprising (although not shown) optical fibers for carrying optical signals and electrical cables for conveying electric power.

As shown in the figure the coupling between the terminal station 22 and the branching unit 20 comprises a first branch cable 23 connected to the terminal station 22 at one end and to a first sea earth by means of a first sea earthing electrode 25 at the other end; and a second branch cable 24 connected to the branching unit 20 at one end and a second sea earth by means of a second sea earthing electrode 26 at the other end. As shown in the figure, the first sea earthing electrode 25 and the second sea earthing electrode 26 are separated from each other thereby no electric contact is present between the two earthing electrodes.

In the particular scenario of FIG. 2, the trunk 21 is coupled to port A and port B and the branch cable 24 is connected to a third sea earth by means of a third sea earthing electrode 27.

With this arrangement, in case the sea earth electrode 27 does not make a reliable contact to the sea earth the dangers and risk of damages as discussed in the case of FIG. 1a would not exist anymore, because even if by error or malfunction, the branching unit 20 switches the trunk voltage onto the branch cable 13, this voltage will not be coupled to the terminal station 22 because of the existence of the second sea earthing electrode 26 which would provide a safe earth connection at the end of the branch cable 24. Furthermore, the presence of physical separation between the first branch cable 23 and the second branch cable 24) and of the first sea earthing electrode 25 at the end of branch cable 23 ensure a further factor of safety and security.

Yet as an additional factor of safety and security, the first sea earthing electrode 25 and the second sea earthing electrode 26 are electrically separated form each other and are disposed at separate locations at a convenient distant form each other in order eliminate or substantially reduce a risk of electrical coupling between the two sea earthing electrodes through the water. An example of a convenient distant may be 10 meters or higher.

FIG. 3a shows a first scenario in the branching unit 30 in which a first segment 31a of the trunk is coupled, through port A, port C and branch cable segment 34 to the sea earthing electrode 36, a second segment 31b of the trunk is coupled, through port B to the sea earthing electrode 37 and the terminal station 32 is coupled through the branch cable segment 33 to the sea earthing electrode 35.

FIG. 3b shows a second scenario in the branching unit 30 in which the first segment 31a of the trunk is coupled, through port A to the sea earthing electrode 38, a second segment 31b of the trunk is coupled, through port B, port C and branch cable segment 34 to the sea earthing electrode 36, and the terminal station 32 is coupled through the branch cable segment 33 to the sea earthing electrode 35.

Here again, the use of the two physically separated sea earthing electrodes 36 and 37, provides significant safety and security factors as regards the above-mentioned risks for the personnel and damage to the equipment.

Preferably, respective ends of the branch cable 23 and the branch cable 24 are incorporated in a sea earthing unit 28. The sea earthing unit is intended to maintain a physical separation between the first sea earthing electrode 25 and the second sea earthing electrode 26 so as to provide a secure isolation between the two electrodes.

FIG. 4 shows an exemplary schematic representation of a sea earthing unit in the connection assembly of FIG. 2. As shown in the figure, the sea earthing unit 40 incorporates an end 41 of a first branch cable segment, for example the segment coupled to the terminal station, and an end 43 of a second branch cable segment, for example the segment coupled to the branching unit. The end 41 of the first branching cable segment is coupled to a first earthing electrode 42 which is secured to the sea earthing unit 40 at one end, and the end 43 of the second branching cable segment is coupled to a second earthing electrode 44 which is secured to the sea earthing unit 40 at another end such that a distance is ensured between the first earthing electrode 42 and a second earthing electrode 44 which is sufficient to avoid, or substantially reduce, a risk of electrical coupling between the two sea earthing electrodes through the water.

Preferably the sea earthing unit 40 comprises an element 45 (for instance a resistor) disposed between the end 41 of the first branching cable segment and the first earthing electrode 42 to facilitate the continuity monitoring of the branch from the land station or offshore platform. This element may be installed inside the sea earthing unit 40.

The various embodiments of the present invention may be combined as long as such combination is compatible and/or complimentary.

Further it is to be noted that the list of structures corresponding to the claimed means is not exhaustive and that one skilled in the art understands that equivalent structures can be substituted for the recited structure without departing from the scope of the invention.

It should be appreciated by those skilled in the art that any block diagrams herein represent conceptual views of illustrative circuitry embodying the principles of the invention.

The invention claimed is:

1. An underwater connection assembly, comprising:
   a branching unit;
   a first optical cable segment configured to be coupled at one end to a terminal station to convey electrical and optical signals to and from the terminal station; and
   a second optical cable segment coupled at one end to the branching unit and configured to convey electrical and optical signals to and from the branching unit;
   wherein the first optical cable segment is configured to be coupled to a first sea earth by means of a first sea earthing electrode without electrically connecting to the branching unit and the branching unit is configured to be coupled to a second sea earth by means of a second sea earthing electrode through the second optical cable segment; and
   wherein the first sea earthing electrode and the second sea earthing electrode are configured to be disposed at separated locations from each other.

2. The underwater connection assembly of claim 1, wherein the first sea earthing electrode and the second sea earthing electrode are separated from each other by means of a sea earthing unit, and wherein the sea earthing unit is configured to maintain the first sea earthing electrode and the second sea earthing electrode separated from each other.

3. The underwater connection assembly of claim 1, wherein the branching unit comprises a submarine branching unit.

4. A submarine optical telecommunication system, comprising:
   a submarine branching unit;
   a first optical cable segment configured to be coupled at one end to a terminal station to convey electrical and optical signals to and from the terminal station; and
   a second optical cable segment coupled at one end to the submarine branching unit and configured to convey electrical and optical signals to and from the submarine branching unit;
   wherein the first optical cable segment is configured to be coupled to a first sea earth by means of a first sea earthing electrode without electrically connecting to the submarine branching unit and the submarine branching unit is configured to be coupled to a second sea earth by means of a second sea earthing electrode through the second optical cable segment; and
   wherein the first sea earthing electrode and the second sea earthing electrode are configured to be disposed at separated locations from each other.

5. The submarine optical telecommunication system of claim 4 further comprising an underwater oil and gas communication network.

6. The underwater connection assembly of claim 1 wherein the terminal station comprises a land station or an offshore platform.

* * * * *